United States Patent

Kaneshiro et al.

[11] Patent Number: 5,950,003
[45] Date of Patent: Sep. 7, 1999

[54] PROFILE INSTRUMENTATION METHOD AND PROFILE DATA COLLECTION METHOD

[75] Inventors: Shaun Kaneshiro, Kailua, Hi.; Junichi Hagiwara; Tatsuya Shindo, both of Kawasaki, Japan

[73] Assignee: Fujitsu Limited, Kawasaki, Japan

[21] Appl. No.: 08/641,353

[22] Filed: Apr. 30, 1996

[30] Foreign Application Priority Data

Aug. 24, 1995 [JP] Japan .................................... 7-216355

[51] Int. Cl.⁶ .................................................. G06F 9/45
[52] U.S. Cl. ............................................ 395/704; 395/709
[58] Field of Search ................................. 395/704, 700, 395/707, 709, 800, 706, 708

[56] References Cited

U.S. PATENT DOCUMENTS

| | | | |
|---|---|---|---|
| 5,317,740 | 5/1994 | Sites | 395/700 |
| 5,367,703 | 11/1994 | Levitan | 395/800 |
| 5,579,520 | 11/1996 | Bennett | 395/704 |
| 5,598,560 | 1/1997 | Benson | 395/707 |
| 5,613,118 | 3/1997 | Heisch et al. | 395/709 |
| 5,659,752 | 8/1997 | Heisch et al. | 395/704 |
| 5,768,592 | 6/1998 | Chang | 395/704 |
| 5,787,285 | 7/1998 | Lanning | 395/704 |

*Primary Examiner*—James P. Trammell
*Assistant Examiner*—Matthew Smithers
*Attorney, Agent, or Firm*—Armstrong, Westerman, Hattori, McLeland & Naughton

[57] ABSTRACT

A profile instrumentation method and a profile data collection method in which mapping between an original code and a corresponding transformed code can be easily performed during compilation so as to perform profiling in a parallel processing system. In the profile instrumentation method, in order to grasp the behavior of a program for a parallel computer written in a sequential format using an original source code, an instrumentation code for instructing collection of profile data during execution of the program is inserted into a transformed code of the program which has been obtained by optimizing transformation during compilation. In this method, a profile initialization processing is performed so as to collect information regarding the original source code of the program before the optimizing transformation by the compilation. This method is used to collect profile data (e.g. the execution time, iteration count, etc., of a specific portion of a program) during the execution thereof so as to grasp the behavior of the program.

24 Claims, 9 Drawing Sheets

INCREMENTING OPERATION IS PERFORMED IN THIS AREA

EXPANDED INSTRUCTIONS FOR LOOP INITIALIZATION WHICH ARE ONLY DERIVED FROM THE ORIGINAL LOOP INSTRUCTION do i = 1,100

NO INSTRUCTIONS INSERTED FROM OUTSIDE THE LOOP BODY end do

FIG.7(a)
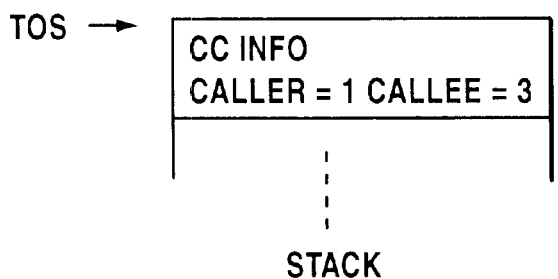
FIG.7(b)
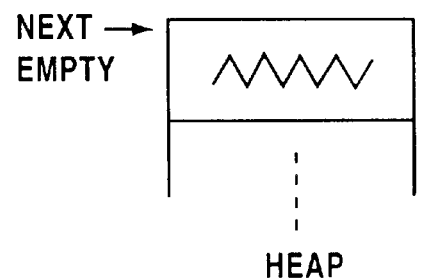
FIG.7(c)

FIG. 8(a)
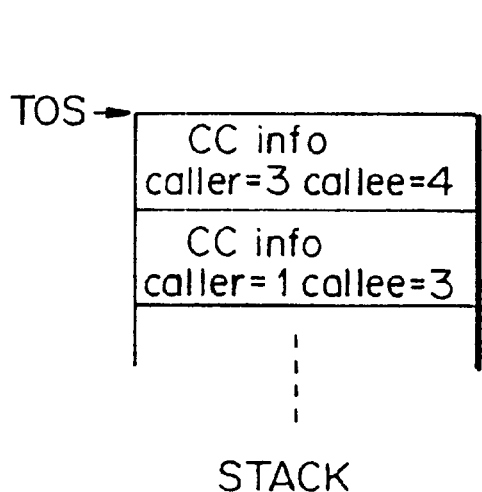
STACK
FIG. 8(b)
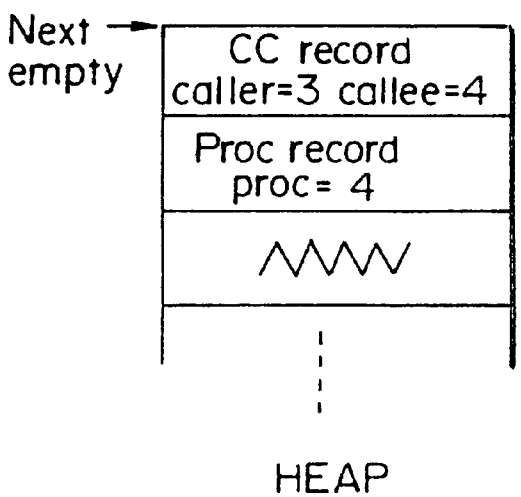
HEAP
FIG. 8(c)
TABLE

STACK

HEAP

STACK

STACK

PROFILE INSTRUMENTATION METHOD AND PROFILE DATA COLLECTION METHOD

BACKGROUND OF THE INVENTION

1) Field of the Invention

The present invention relates to a method for measuring the execution time, iteration count, etc., of a specific portion of a program during its execution and for collecting the measured values as profile data so as to grasp of the behavior of the program.

2) Description of the Related Art

Generally, programmers need a profiling tool so as to better understand the behavior of their programs. The profiling tool is a means for obtaining and reporting, as profile data, specific instruction execution times measured by counters or the like, as well as timing information at the procedure, basic block level, and/or instruction level.

Specific program portions to be subjected to profiling are loops, timed regions, and conditionals. For loop profiling, the execution time and iteration count of a designated loop in a program are measured as profile data. For timed region profiling, the execution time of a designated timed region in the program is measured as profile data. For conditional (conditional branch) profiling, the results of judgment regarding a designated condition in the program are processed to obtain statistical information as profile data.

When the above-described profiling is performed for a program executed by a single processor, the profiling is conventionally performed as follows. A profiling tool is optioned for a sequential compiler when the program is compiled by the compiler. As a result, during the sequential compilation, instrumentation codes for designating a portion to be measured for collection of profile data are inserted (instrumented) into the codes constituting the program. Then, the above-described measurement is performed to collect profile data.

In contrast, when a sequential program written by a user is executed by a plurality of processors in parallel, the profiling is performed as shown in FIG. 12. First, a program written by using an original code [input Fortran: e.g., HPF (High Performance Fortran) code] is inputted (step A). Then, compilation is performed for the program so as to convert it to a form suitable for parallel processing (step A2), and the converted program is outputted in a target language code [output Fortran: e.g., Fortran 90] (step A3). In this specification, the original code will be sometimes referred to as an "original user code" or an "original source code".

After that, sequential compilation is performed for each of the programs for the processors so as to generate a program executable by the corresponding processor (step A4). Then, parallel processing is performed by the plurality of processors in accordance with the respective programs (step A5). During the compilation of the original code in step A2, code transformation is performed to realize faster processing, i.e., optimization is performed.

Even when profiling is performed in a parallel processing system, instrumentation codes for identifying the measurement start point and the measurement end point of an appropriate construct of the program must be inserted (instrumented) into the original code of the program so as to collect profile data. When the insertion of instrumentation codes is performed at the beginning of a compilation so as to carry out profiling, a possibility arises that the instrumentation slightly alters the optimization performed by the compiler. Therefore, the insertion of instrumentation codes must be performed after completion of all code conversions.

In the case where the above-described instrumentation codes are inserted, although it is easy to map profile data that have not undergone the sequential compilation (step A4) to corresponding profile data that have undergone the sequential compilation, it is difficult to map profile data that have not undergone compilation in which the above-described optimization is performed (step A2) to corresponding profile data that have undergone this compilation, because the original code is transformed by the compilation in step A2. Since a user inputs a program using the original code (input Fortran), the user cannot effectively utilize profiling results (i.e., cannot reflect the profiling results in the preparation of programs) if the profiling results cannot be obtained in a form corresponding to the original code.

When the above-described optimized code is debugged, the optimized code converted from the original code must be mapped to the user-written original code. To that end, a technique for causing a compiler to hold detailed histories of code transformations which will be debugged later is disclosed, for example, in "A New Approach to Debugging Optimized Code" (G. Brooks, G. Hansen, and S. Simmons, SIGPLAN '92 Conf., Programming Language Design and Implementation, pp. 1–11, 1992). However, unlike the case of debugging, a profiler does not need such detailed information about code transformation so as to identify constructs of a program to be profiled.

The prerequisite requirement of the profiling tool is to report accurately the behavior of a program being profiled. However, in order to collect profile data, instrumentation codes must be inserted into the original code, as described above, so as to activate and deactivate timers and to increment counters when predetermined constructs of a user-written program are executed.

Since subroutines (profile library subroutines, run-time library subroutines) which are called by the instrumentation codes are executed during the execution of the program written using the original code, a perturbation is produced, thereby skewing the behavior of the original program. Especially, when parallel programs are generated in a manner as has been described with reference to FIG. 12, the perturbation becomes more significant than the sequential program, causing a problem of increased overhead in which other processors must wait for the slowest processor to complete its processing.

There are two methods to obtain elapsed time in profile run-time systems, one which samples the instruction pointer and the other which uses a timer (clock).

Generally, a processor executes a program while holding the address of an instruction presently being executed. The instruction pointer (program pointer) designates the address of the instruction presently being executed. Therefore, an elapsed time can be obtained as profile data by sampling the value of the pointer and measuring the elapsed time from a point in time when the pointer address leaves a previously designated address to another point in time when the pointer address reaches another address.

That is, in the first method, the instruction pointer is sampled at constant intervals (at a constant sampling period), and the elapsed time of a designated area is calculated by multiplying the value of the instruction pointer for the designated area by the sampling period.

This method brings about the advantage of making the sampling cost constant. However, this method has the following disadvantages: (1) potential inaccuracy of calculated elapsed time, (2) necessity of processing the object code, and (3) difficulty in classifying the location of the instruction pointer (e.g., communication, synchronization, global operation, and run-time library).

In contrast, the second method has the following advantages: (1) reported elapsed time is accurate; (2) no further processing of the code is necessary after instrumentation using a clock; and (3) marking function categories in the compiler run-time library is simple (trivial). However, this method increases the overhead. When the overhead increases due to profiling, the execution time of a program accompanied by profiling becomes very long.

Since the execution time of a program generally increases when profiling is performed, it is desired to make the overhead time due to the profiling as short as possible.

In general, when profiling is performed for a procedure, each pair of a caller-side function (caller side: hereinafter referred to as a "caller") and a callee-side function (callee side: hereinafter referred to as a "callee") is grasped, and the execution time and the iteration count are measured for each caller-callee pair.

If the maximum number of caller-callee pairs at the time of execution is known, a two-dimensional table of caller-callee pairs (table for holding the caller-callee relationship of the functions) is prepared. In this case, the lookup and storage of information regarding the caller-callee pairs can be easily performed while performing the lookup at a small constant cost, without causing collisions of data.

However, in order to determine the maximum number of caller-callee pairs, an additional module for examining and modifying the object code is needed during link time. If all caller-callee pairs are considered, the two-dimensional table becomes quite huge, and therefore a large memory area must be wastefully prepared in the memory during the initialization.

One alternative method is to use a data structure the capacity of which increases dynamically during the execution of a program. An example of such a data structure is a hash table. When a hash table is used, only the record of the presently existing caller-callee pair can be held without wastefully using the memory space. However, since the hash table has a characteristic that its lookup time depends on the length of the list, the lookup cost is not constant and relatively large in the hash table. Although it is possible to control the length of the list by dynamically remaking the hash table, an inconstant and wasteful overhead is produced in that case.

SUMMARY OF THE INVENTION

The present invention was conceived to solve the above mentioned problems, and a first object of the present invention is to provide a profile instrumentation method capable of automatically inserting profiling instrumentation codes during compilation while facilitating the mapping between an original code and a transformed code obtained through the compilation, thereby making it possible to perform profiling in a system in which parallel processing is performed.

A second object of the present invention is to provide a profile data collection method which can lower as much as possible the overhead cost during the execution of profiling, thereby making it possible to regard, from a practical viewpoint, the execution of a program accompanied by profiling to be substantially the same as the execution of a corresponding program not accompanied by profiling, and which can make it possible to easily calculate overhead due to profiling by making the function cost constant, thereby making it possible to easily obtain the execution time for the case in which the profiling is not performed.

In order to attain the first object, the present invention provides a profile instrumentation method wherein in order to grasp the behavior of a program for a parallel computer written in a sequential format using an original source code, an instrumentation code for instructing collection of profile data during execution of the program is inserted into a transformed code of the program which is obtained by optimizing transformation during compilation. In this method, a profile initialization processing is performed so as to collect information regarding the original source code of the program before the optimizing transformation by the compilation.

Preferably, the information regarding the original source code comprises, for each statement written in the original source code, file information, location information, a character-string statement, a statement kind, and information regarding a parent statement.

Preferably, during the optimizing transformation by the compilation, history storage processing is performed so as to store, for each statement, information specifying an original statement of the each statement as transformation history information.

Preferably, summarization processing is performed to identify statements derived from the same original statement so as to extract necessary information from the transformation history information based on the transformation history information, thereby summarizing the transformation history information, and so as to map the transformed code to the original source code. Subsequently, instrumentation processing is performed so as to insert the instrumentation code into the transformed code based on the information extracted by the summarization processing and in accordance with a predetermined restriction.

In the above-described profile instrumentation method according to the present invention, the original source code information of a program is collected by the profile initialization processing before the optimizing transformation by the compilation. Accordingly, it becomes possible to perform mapping between the transformed code and the original source code based on the collected original source code information.

Also, during the optimizing transformation by the compilation, information specifying each original statement subjected to transformation is stored as transformation history information by the history maintaining processing. Accordingly, in the present invention, the history can be obtained from the information specifying the original statement using a simple maintaining algorithm [summation (union) or copy operation (duplicate operation)], without keeping a detailed transformation history as in the case of a conventional debugging.

Moreover, after both the summarization of the transformation history information by the summarization processing and the mapping between the transformed code and the original source code, an instrumentation code is inserted into the transformed code by the instrumentation processing in accordance with the result of the summarization and the predetermined restriction. At this time, the mapping between the original source code and the transformed code can be performed accurately by complying with the predetermined restriction regarding the transformation.

As described above, the profile instrumentation method according to the present invention has the following three main features: (1) collection of information regarding an original code, (2) holding code transformation history (transformation history information), and (3) preparation of data for mapping the output code (transformed code) to the original source code. Using these features, an automatic profile instrumentation for the optimized single-threaded code can be performed during compilation while performing mapping between the original code and the transformed code obtained through compilation.

As described above, the first object is attained through the "detailed design data structure and algorithm" of the original source code, and through handling instructions (transformation history information) derived for each transformed statement (transformed code). The data structures (transformation history information) are managed in accordance with a series of simple rules, and summarized based on the collected data and information regarding the control flow. That is, the transformation history information is updated via summation or copy operation in accordance with transformation applied to each original source code. During the summarization processing, the collected data are analyzed based on the transformation history information, the parent-child relationship between statements, and information regarding the control flow.

To attain the second object, the present invention provides a profile data collection method in which profile data are obtained and collected during the execution of a program so as to grasp the behavior of the program. This method is characterized in that a stack area, a heap area, and a table are previously built into a dynamic array data structure, and that when profiling is performed so as to collect profile data, data storage processing is performed so as to store data regarding the profiling into the stack area, the heap area, and the table.

Preferably, at the beginning of measurement of profile data, information regarding an object to be profiled is pushed into the stack area. At the end of the measurement, the above-described information is popped from the stack area, and a record regarding the profile data obtained via measurement is written into the heap area, and the caller-callee relationship of the functions during profiling is written into the table so as to hold these data.

Preferably, the table for holding the relationship between a caller and a callee is expressed as a two-dimensional array mapped into a single dimensional array.

Preferably, both an initialization processing for securing areas for the stack area, the heap area and the table, and cleanup processing for cleaning up the stack area, the heap area and the table after completion of the profiling are executed independently of program execution processing including the above-described profiling, The above-described present invention is a profile data collection run-time system for a parallel or sequential program and relates to a profile run-time system which is realized on a single processor or on a plurality of processors. This system collects run-time information, using counters and timers, in accordance with instrumentation codes which are generated by a compiler and which designate the start point and end point of a portion to be profiled. The system also summarizes the collected run-time information and notifies the summarized information.

That is, the profile run-time system can handle previously instrumented sequential codes by using calls to a communication library so as to execute the sequential codes on a single processor or on a multi processor machine. It is assumed that codes to be profiled have already been instrumented using calls to profile library subroutines. The profile library subroutines serve to identify the beginning and end of an area, a procedure, a loop, or a timed region to be profiled, as well as to identify a conditional.

In the profile data collection method according to the present invention, the management of the stack area, the heap area, and the table, all located inside of the program execution processing, is centered, and the above-described memory areas are designed such that the initialization cost and the clean up cost are pushed out to the outside of the program execution processing (area for which time is measured), thereby making the cost of frequently performed operations [push/pop performed against the stack area, allocation performed against the heap area, lookup performed against the table] small and substantially constant.

Further, in the present invention, since the data structure is designed such that its capacity dynamically increases, there is a possibility that a non-constant cost is added due to expansion of the memory area. However, since such expansion of the memory area does not occur frequently and its cost is relatively small compared to the halt (rest) of a program, overhead due to the expansion of the memory area can be ignored.

Moreover, all basic data structure manipulation can be easily realized through the use of caching, except for lookup of the table which holds the relationship between callers and callees (caller-callee record lookup). When it is assumed that the number of caller-callee pairs increases as the execution of a program progresses and the performance of the above-described lookup is restricted to a constant cost, the implementation of the table is represented as a two-dimensional table mapped to a one-dimensional table.

As described above, in the profile instrumentation method according to the present invention, profiling instrumentation codes for a parallel processing system can be automatically inserted during compilation while easily performing mapping between an original source code and a transformed code obtained by the compilation. Accordingly, it is possible to easily obtain a profiling result having a form corresponding to the original source code based on the above-described mapping. Therefore, a user can effectively utilize the profiling result and reflect it in the preparation of programs.

Further, in the profile data collection method according to the present invention, since the overhead cost of operations frequently performed during the execution of profiling can be made small and constant, it is possible to regard, from a practical viewpoint, the execution of a program accompanied by profiling to be substantially the same as the execution of a corresponding program not accompanied by profiling. In addition, due to the constant cost, it is possible to easily calculate overhead due to profiling, thereby making it possible to easily obtain the execution time for the case in which the profiling is not performed.

Moreover, since the table for holding the caller-callee relationship is provided in the dynamic array data structure and is expressed as a two-dimensional table mapped to a one-dimensional table, it is possible to prevent the memory area from being wastefully used, while maintaining constant the lookup cost without increasing overhead.

BRIEF DESCRIPTION OF THE DRAWINGS

FIG. 7(a)–FIG. 7(c) are diagrams for explaining a concrete example of data storage processing in the second embodiment;

FIG. 8(a)–FIG. 8(c) are diagrams for explaining the concrete example of data storage processing in the second embodiment;

DESCRIPTION OF THE PREFERRED EMBODIMENTS

Embodiments of the present invention will now be described with reference to the drawings.

(a) First Embodiment (Profile Instrumentation System)

Figure 1:
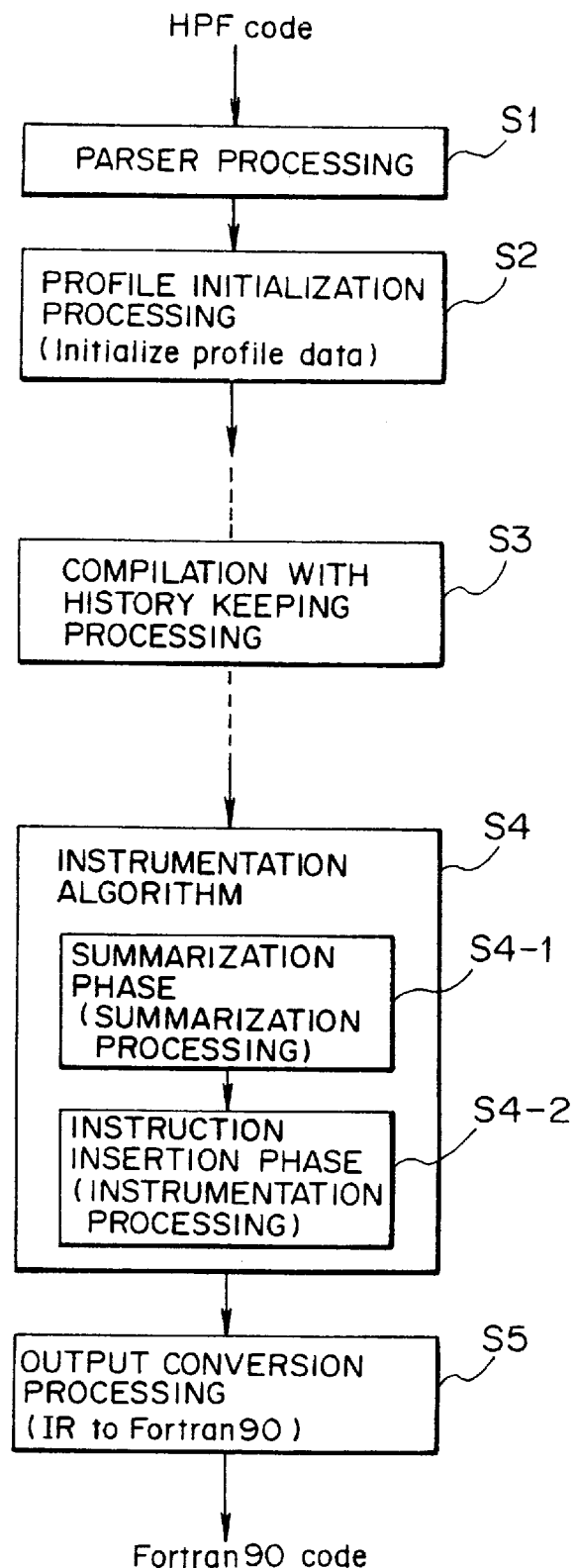
FIG. 1 shows a flowchart for explaining a profile instrumentation method as a first embodiment of the present invention, and a block diagram equivalently showing summarized profile components in a compiler of a profile instrumentation system to which the present method is applied.

FIG. 1 is a flowchart (steps S1–S5) for explaining a profile instrumentation method as a first embodiment of the present invention. The present embodiment will be described while referring to the step numbers in this flowchart whenever necessary.

Here, a method for instrumenting optimizing codes is explained by first defining the kind of profile data to be collected and a profile run-time library interface. Next, this method is further explained by the descriptions of two data structures which hold an original statement (statement of an original user code) and information regarding transformation history. The explanation is completed by the descriptions of the holding of the transformation history, an instrumentation algorithm, and a summarization algorithm.

(a1) Type of information (profile data) collected

A system of the present embodiment collects profile data at the procedure level and the instruction level for loops and conditionals. When a source language (sometimes referred to as an "original source code", "original user code", or "original code") to be profiled is High Performance Fortran (HPF) code, there are included constructs specific to the language, i.e., array expressions, WHERE constructs, and FORALL constructs. Inputted HPF codes are interpreted by parser processing in step S1 of FIG. 1, so that they are converted into an internal representation (IR: intermediate representation) of the compiler.

Three types of information are collected during profiling - an elapsed time, invocation and iteration counts, and a dynamic call tree. For procedures, loops, and timed regions the total elapsed time is measured. Frequency counts are measured for all structures to be profiled to mark the number of times a statement is executed, the number of times a procedure is executed, the number of iterations in a loop, and the number of times a conditional branch is taken.

(a2) Run-time library interface

The profiling run-time library interface consists of eleven subroutines which identify the timed areas and conditionals, and information about the original code passed as arguments to the library subroutines. Hereinbelow, there is described information that must be provided by a summarization phase, in particular identification of constructs to be profiled and conveyance of the original source code description to a run-time library. In Table 1, the profile run-time library subroutines are listed.

TABLE 1

| Run-time library subroutine | Description |
| --- | --- |
| start profile (name, record) | Function: Perform initialization for the profile session, and start timer for the timed session. Placement: Called at the beginning of the main subroutine. |
| end profile | Function: Complete the user code profiling, summarize the collected data, output the data to a file, and deallocate memory. Placement: Called before exiting the main subroutine. |
| start procedure (name, record) | Function: Start the timer and increment counter for caller-callee record. Placement: Called at the beginning of all procedures except the main routine. |
| end procedure | Function: Stop the timer in the caller-callee record. Placement: Called before exiting all procedures except the main subroutine. |
| start, loop (name, record, entry incr) | Function: Start timer only for the loop or region. Placement: Called before entering a loop or a timed region. |
| start region (name, record, entry incr) | |
| end loop | Function: Stop the timer in the loop or region record. Placement: Called after exiting after a loop or region. |
| end region | |
| incr loop | Function: Increment the number of loop iterations for the loop. Placement: Called after every loop iteration. |
| start log if (name, record, value) | Function: Increment the conditional count for record based on value. Placement: Called before entering the conditional. |
| start arith if (name, record, value) | |

In Table 1, "start log if" is used for starting profiling for a logical if, and "true" or "false", which is a result of the conditional, is set as the value. "start arith if" is used for starting profiling for an arithmetic if, and "+1", "0", or "–1", which is a result of the conditional, is set as the value.

The name argument is associated with a descriptive string conveying information about the original source code. Since no other means is used to provide data to the profiler, the string must contain enough information to map feed back profile information to the original source code, and to be readable by a user when being accessed by a profile data display tool. The procedure descriptive string contains the file name and procedure name. The loop, region, arithmetic if, and logical if contain a serial statement number (sequential number), an actual line number in the source code, and a short description.

(a3) Data structure

Two data structures, referred to as "StmtInfo" and "SetOfStmtInfo", used to maintain the original source code and transformation history information are described below.

By the profile initialization processing shown in FIG. 1 (step S2), the source information regarding each original statement (statement written using the original source code) is stored in a StmtInfo structure. The structure includes information of the file which directly contains this line (FileInfo), actual line number (lineno) in the file, and a unique statement serial number (serno).

For profile-related field, the "desc(description)" field contains an abbreviated description of the original statement (the contents of the statement). "pStmtInfo" points to "StmtInfo" of the parent statement of that statement, "stmtKind" contains the type of the original statement (kind of statement: e.g., DO statement, FORALL), and "containArrayExpr" is set based on whether the top-level statement contains an array expression (it is set to "true" when the top-level statement contains an array expression).

```
Struct StmtInfo {
FileInfo    *file;              /* file that contains this
                                   line directly */
int         lineno;             /* line number counted in file */
int         serno;              /* serial stmt number through
                                   the procedure block */
char        *desc;              /* string description of
                                   statement on line */
StmtInfo    *pStmtInfo;         /* stmtinfo's stmt's parent's
                                   stmtinfo */
StmtKind    stmtKind;           /* statement kind */
Bool        containArrayExpr;   /* True if stmtinfo's
                                   statement contains an array
                                   expression */
};
```

To maintain the code transformation history, each statement data structure is expanded using a list of "StmtInfo", called "SetOfStmtInfo". The inclusion of a "StmtInfo" in the list indicates that the current statement is derived from the statement described in the "StmtInfo".

(a4) Transformation history

There are five basic transformations performed for the original user code during compilation (step S3 in FIG. 1): null transformation, merge transformation, code eliminate transformation, expand transformation, and code movement transformation. Each transformation will be described with an example.

Statements (e.g., nested DO loops) contained in a statement body are assumed to automatically inherit the SetOfStmtInfo (transformation history information) of the enclosing statement. As a result, when moving statements from within a body to the outside of the body, the enclosing statement's SetOfStmtInfo is added to the moved statement's SetOfStmtInfo.

(a4-1) Null transformation

The NULL transformation is defined as a statement introduced into the code which has no relationship with any original statements, i.e., a transformation which produces a transformed code (statement) having no relationship with the original source code. "NULL" is set into the SetOfStmtInfo field of these statements. An example of such a transformation is a profile instrumentation code since none are derived from any original statement.

(a4-2) Merge transformation

The merge transformation is a transformation in which multiple statements are condensed into a single statement or a set of statements. The SetOfStmtInfo for the newly created statement is one obtained by adding (unifying) together the SetOfStmtInfo of the merged statements. In the following Example 1, the statement A and the statement B are merged into the statement C. The value in [] on the left side represents the ID (serial number) of the corresponding original statement. When three statements on the left side are merged into a new statement on the right side, a transformation history representing the derivation of the new statement from the three statements is held as "SetOfStmtInfo" [1 2 3] for the new statement that has undergone the merge transformation.

(Example 1)

[1] $A = \ldots A\ RHS \ldots$ →

[2] $B = \ldots B\ RHS \ldots$ →

[3] $C = A + B$  →  [1 2 3] $C = \ldots A\ RHS \ldots + \ldots B\ RHS \ldots$ (a4-3) Code elimination transformation The code elimination transformation is the removal of statements from the code. No operation is performed on the SetOfStmtInfo.

(a4-4) Expand transformation

The expand transformation is the most common, a one-to-many statement expansion, where a statement is replaced with a single statement or several statements. The SetOfStmtInfos for the newly generated statements are copies of the original statement's SetOfStmtInfo fields. An example (Example 2) in which a FORALL instruction is expanded into DO loops, and an example (Example 3) in which a single loop is separated into two different loops are shown below.

(Example 2)

| [1] FORALL(I = . . . ) | -> | [1] DO I = . . . |
| [2] A[I] = . . . | -> | [2] A[I] = . . . |
| END FORALL | | END DO |

(Example 3)

| [1] DO I = . . . | -> | [1] DO I = . . . |
| [2] A[I] = . . . | -> | [2] A[I] = . . . |
|  | -> | END DO |
|  | -> | [1] DO I = . . . |
| [3] B[I] = . . . | -> | [3] B[I] = . . . |
| END DO | -> | END DO |

(a4-5) Code movement transformation

In the code movement transformation, the order of statements is modified. If a code is moved from inside a body to outside the body, the SetOfStmtInfo contained in the statement to be moved is expanded with the SetOfstmtInfo from the enclosing statement. Otherwise, no modification is needed. An example (Example 4) in which a code is moved from a certain statement body to another statement body, and an example (Example 5) which has swapped statement bodies are shown below.

In Example 4, the assignment to the statement B is removed from the loop J and inserted into the loop I. So, the SetOfStmtInfo of the statement B is unified with the SetOfStmtInfo for the loop moved from [3], and loop J is removed.

In Example 5, the nested loops iterating over I, J and K are swapped so that they iterate over K, J, and I. This transformation can be thought of as moving the loop K outside the nested loops J and I, moving the loop J outside the loop I, moving the loop I into the loop J, and then finally moving the loop J into the loop K.

(Example 4)

| [1] DO I = . . . | -> | [1] DO I = . . . |
| [2] A = . . . | -> | [2] A = . . . |
| END DO | -> | |
| [3] DO J = . . . | -> | [3 4] B = . . . with some change . . . |
| [4] B = . . . | -> | |
| END DO | -> | END DO |

(Example 5)

| [1] DO I = . . . | -> | [1 2 3] DO K = . . . |
| [2] DO J = . . . | -> | [1 2] DO J = . . . |
| [3] DO K = . . . | -> | [1] DO I = . . . |

(a5) Instrumentation algorithm

The instrumentation algorithm (step S4 shown in FIG. 1) can be broken into two phases, a summarization phase (summarization processing; step S4-1 shown in FIG. 1) in which the current instruction (transformed code) is mapped to the original user code, and an instruction insertion phase (instrumentation processing; step S4-2 shown in FIG. 1) in which calls (instrumentation codes) are inserted into a profile run-time library.

(a5-1) Summarization phase

In the summarization phase, the transformed code is mapped to the original user-written code based on the StmtInfo transformation history. The summarization is processing relating to compounded merges, code movement, and expansions, particularly relating to nested loops, and non-contiguous timed regions. In the summarization, conservative assumption is made about the code transformations so as to make reports by the profiler accurate. Each process algorithm is described using pseudo-codes as follows.

First, the following variables used in pseudo-codes are defined.

| CURSTMTS | :Set of all transformed statements. |
| ORIGSTMTS | :Set of all original statements. |
| INTERESTINGSTMT-DO | :DO loop. |
| INTERESTINGSTMT-REGION | :Array expansion, Do loop, Forall, Where. |
| INTERESTINGSTMT-IF | :Arithmetic if and logical if. |
| processedCurStmt | :Set of processed transformed statements. |
| processedOrigStmt | :Set of processed original statements. |
| unprocessedCurStmt | :Set of unprocessed transformed statements. |
| unprocessedOrigstmt | :Set of unprocessed original statements. |
| t ⊂ u | = If t is contained in u's body "TRUE" "FALSE" Otherwise |
| TopMostStmt(S) | = {t,u ∈ s $\|\forall t(\forall u(t \subset u))$} |

Driver routines of the summarization phase are described as follows using variables defined as described above.

Driver routine

I. Call sub-region-do (ORIGSTMTS, CURSTMTS)
II. Call sub-conditional (ORIGSTMTS, CURSTMTS)
sub-region-do (ORIGSTMTLIST, CURSTMTLIST)
processedCurstmt = NULL
processedorigStmt = NULL Driver routine unprocessedCurStmt = CURSTMTLIST
unprocessedorigStmt = ORIGSTMTLIST
I. Process
While (INTERESTINGSTMT-REGION and INTERESTINGSTMT-DO) does not exist in unprocessedorigStmt do
CHOSEN = the first, lexically outermost INTERESTINGSTMT-REGION or INTERESTINGSTMT-DO statement from unprocessedOrigStmt
1. Calculate CHOSEN's related CURSTMT and StmtInfo by calling
ExtRelCurStmt, ExtRelCurStmtStmtInfo =
ExtRelCurStmtAndStmtInfo (CHOSEN, ORIGSTMTLIST, CURSTMTLIST)
2. Calculate topmost statements by calling
TOPMOST = TopMostStmt (ExtRelCurStmtStmtInfo)
3. Calculate descriptive string
if ExtRelCurStmt is well-formed loop
Set string to do loop description
Mark statement as loop
else
Set string to description of all involved statements
Mark statement as region
4. Mark current statement and original StmtInfo as processed
if ExtRelCurStmt is well-formed loop
Remove TOPSTMT from unprocessedOrigStmt and unprocessedCurStmt
Call sub-region-do (unprocessedOrigStmt, unprocessedCurStmt)
else
unprocessedCurStmt = unprocessedCurStmt − ExtendedRelatedCurStmt
processedCurStmt = processedCurStmt + ExtendedRelatedCurStmt
unprocessedOrigStmt = unprocessedOrigStmt − ExtendedRelatedCurStmtstmtInfo
processedOrigStmt = processedOrigStmt + ExtendedRelatedCurStmtStmtInfo
5. Insert timing calls
if ExtRelCurStmt is well-formed loop
Instrument as loop.
else
Instrument as region.
II. Mark remaining statements as processed.
sub-conditional (ORIGSTMTLIST, CURSTMTLIST)
processedCurStmt = NULL
processedOrigStmt = NULL
unprocessedCurStmt = CURSTMTLIST
unprocessedOrigStmt = ORIGSTMTLIST
I. Process
while (INTERESTINGSTMT-IF) does not exist in unprocessedOrigStmt do
CHOSEN = the first, lexically innermost INTERESTINGSTMT-IF from unprocessedOrigStmt
1. Calculate CHOSEN's related CURSTMT and StmtInfo by calling
ExtRelCurStmt, ExtRelCurStmtStmtInfo =
ExtRelCurStmtAndStmtInfo (CHOSEN, ORIGSTMTLIST, CURSTMTLIST)
2. Check related statements.
If ExtendedRelatedCurStmtstmtInfo contains origstmt other than CHOSEN and CHOSEN's descendants.
Mark all origstmt and curstmt as have been used.
Continue.
3. Calculate topmost statement.
TOPMOST = TopMostStmt (ExtRelCurStmtStmtInfo)
4. Check nesting and shape.
If nesting of ExtRelCurStmt does not match original
Mark all origstmt and curstmt as have been used.
Continue.
5. Create descriptive string.
6. Insert annotation.
ComputeExtendedCurStmtAndStmtInfo ( s, OS, CS)
Define ExtReLCurStmt and ExtRelStmtInfo as follows:
ExtReLCurStmt(s, OS, CS, ERCS, ERCSSI) =
ERCS = ERCS U {a e CS | s e a.SetOfStmtInfo}
do while no change to ERCS
ExtRelCurStmtStmtInfo(s, OS, CS)
ERCS = ERCS U {a e CS, b e ERCSSI | b ea.SetOfStmtInfo}
ERCS = ERCS U {a e ERCS, b e CS | b c a}
ERCS = ERCS U {a e CS, b e ERCSSI | ((s c a)&&(a c b)) }
ExtRelStmtInfo(s, OS, CS) =

-continued

Driver routine

ERCS = ERCS U {s}
ERCS = ERCS U {a e CS | a c s }
do while no change to ERCSSI
ExtRelCurStmt(s, OS, CS)
ERCSSI = ERCSSI + {b e ERCS | b.SetOfStmtInfo}
ERCSSI = ERCCSI + {a e CS, b e ERCS | (s c a)&&(a c b))}
ERCS = NULL
ERCSSI = NULL
ExtRelCurStmt(s, OS, CS, ERCS, ERCSSI)
Return ERCS and ERCSSI (a5-2) Instruction insertion phase In the instrumentation phase, i.e., in the instruction insertion phase, profile run-time library subroutine calls are inserted for profiling at procedure and instruction levels.

Processing for inserting instructions into a procedure is simple. If the procedure is a main subroutine, then "start profile" and "end profile" (instrumentation codes) are inserted as the first and last statements in the subroutine. If another exit exists, then "end profile" is inserted prior to that exit. For procedures which are not a main subroutine, "start procedure" and "end procedure" are inserted.

When instructions are inserted into loops, it is necessary to perform identifying the starts and ends of loop areas, identifying noncontiguous regions, identifying a loop corresponding to the original loop, and inserting a loop instrumentation. At the first stage, the contiguous areas of the loop statements are identified. The areas are marked with "start loop" and "end loop" which are library calls (instrumentation codes) for clocking the loop instruction. A loop in the set of statements is identified and marked as corresponding to the original loop (processing for giving the same NAME to loops having the same origin and other processing are performed). "incr loop", which is a library call (instrumentation code) for counting the loop iteration count, is inserted as the first statement in the loop body.

The insertion of instructions into a timed region is performed in a manner similar to the above-described insertion of instructions into loops except for portion in relation to "incr loop".

For conditionals to be profiled, the original conditional statement is identified as the last in the list of related statements. The conditional value is written into "value", which is a scratch variable as has been described with reference to Table 1, to avoid evaluating the value twice when measuring the profile information and when evaluating the actual conditional. The library call (instrumentation code), which is used in a profile instrumentation performed for conditionals, is added prior to entering the conditional.

(a6) Overview of First Embodiment

FIG. 1 shows a flowchart for explaining the above-described profile instrumentation method as a first embodiment of the present invention, and also equivalently shows summarized profile components in a compiler of a profile instrumentation system to which the present method is applied.

As shown in FIG. 1, the compiler is basically a source-to-source translator arranged as a series of modules S3 which transform and optimize the internal representation (intermediate representation) of the code. The module path starts with the parser S1 which converts the original source code (HPF code in the present embodiment) into the internal representation (IR), and ends with a converter (output conversion processing in step S5 shown in FIG. 1) which converts the internal representation to an output code (Fortran 90 in the present embodiment).

The module S2 for profile initialization processing immediately following the parser S1 collects data about the original source code before any code modifications take place. The subsequent compilation module S3 transforms the intermediate code while maintaining the transformation history. The instrumentor module (instrumentation algorithm) S4, one of the last modules in the compiler pass, maps the transformed code to the original source code (summarization processing module S4-1) and inserts the appropriate calls (invocation and instrumentation codes) to the profile run-time library subroutines (instrumentation processing module S4-2).

(a7) Concrete Example

To illustrate the transformation history maintenance and the insertion of instruction (profile instrumentation function), the codes given below will be used as an example. Although there are several modules which transform the intermediate representation code, only two (array expression expansion and communication optimization) have been selected for the purpose of this example. The initial code is shown as a set of StmtInfo initialized with the original statements.

```
1 [1]    do i = 1, 100
2 [2]        a(i,2:100) = a(i,1:98)
3            . . .
4    end do
```

(a7-1) Step A—Array expression expansion

In the array expression expansion phase, the array expression is scalarized to a loop expression which contains a copy of transformation history information "SetOfStmtInfo" from the original array expression. The number at the beginning of each line represents a line number (lineno), and the number in [] represents a serial number (serno).

```
1 [1]    do i = 1, 100
2 [2]        do j = 2, 99
3 [2]            a(i,j) = a(i,j+1)
4            . . .
5        end do
6    end do
```

(a7-2) Step B—Communication optimization

In the communication optimization phase, data residing on remote processors are bulk transferred to local temporary areas to minimize communication time. The example below shows some communication optimization code which had been introduced before the loop and the assignment statement were modified so as to put references into a scratch array. The introduced code succeeds its transformation history information "SetOfStmtInfo" from the assignment statement and enclosing loops.

```
1 [1 2]   . . . comm. opt.  . . .
2 [1]     do i = 1, 100
3 [2]         do j = 2, 99
4 [2]             a(i,j) = tmp a(i,j+1)
5         end do
6     end do
```

(a7-3) Step C—Transformation history summarization

In this processing (summarization processing), statements derived from a common original statement are identified based on the transformation history information "SetOfStmtInfo" so as to extract necessary information from the transformation history information, thereby summarizing the transformation history information. Also, the transformed codes are mapped to the original source codes.

Specifically, by providing the ID (serno) ("1" in this case) of the outermost unprocessed original statement to "CHOSEN statement", processing for instrumentation summary is started. In the first calculation of the above-described ExtendedRelatedCurStmtStmtInfo and ExtendedRelatedCurStmt, all statements containing "1" in their SetOfStmtInfos are included. That is, codes which have been transformed from statements relating to "1", and the original statement of "1" and been optimized are stored.

```
CHOSEN statement = 1
ExtendedRelatedCurStmtStmtInfo = [1]
ExtendedRelatedCurStmt =  [1 2]  ... comm. opt. ...
                          [1]      do i = 1, 100
                          [2]        do j = 2, 99
                          [2]          a(i,j) = tmp
                                              a(i,j+1)
```

In the next iteration for computing ExtendedRelatedCurStmtStmtInfo, "2", which is the ID of the unprocessed original statement, is now included in the set. Subsequently, processing similar to the above is performed.

```
ExtendedRelatedCurStmtStmtInfo = [1 2]
ExtendedRelatedCurStmt =  [1 2]  ... comm. opt. ...
                          [1]      do i = 1, 100
                          [2]        do j = 2, 99
                          [2]          a(i,j) = tmp
                                              a(i,j+1)
```

(a7-4) Step D—Instruction insertion

Because a nested communication optimization line does not match with that of the original statement, the DO loop associated with line 1 cannot be timed as a loop. Instead, it is treated as a timed region. The first and last statements in the region are identified, and "start region" and "end region" serving as instrumentation codes are inserted at appropriate positions as described bellow. The descriptive string includes both the loop and array expression.

```
        data name/'{1 1 do i = 1, 100}{2 2 a(i,2:99) =
            a(i,2:100)}'/
        data record/0/
[ ]     start region(name,record)
[2]     ... comm. opt. ...
[1]     do i = 1, 100
[2]        do j = 2, 99
[2]          a(i,j) tmp a(i,j+1)
           end do
        end do
[ ]     end region( )
```

(a8) Restrictions at the Time of Instruction Insertion

As described above, in the instrumentation processing (instruction insertion phase), instrumentation codes are inserted into the transformed code in accordance with predetermined restrictions regarding the result of summarization and transformation. At that time, by following the restrictions, mapping between the original source code and the transformed code can be performed accurately. Here, the restrictions at the time of instruction insertion will be described.

The following two items (1) and (2) are not restrictions but the characteristics of data reported by the profiling system.

(1) In instrumentation, only profile instructions which have been executed are reported in the profile report. The reason is the timers and counters are started/stopped/incremented only when profile instrumentation instructions such as start loop and start procedure are executed. Aside from the instrumentation instructions, there is no other way to pass information about the source code to the profile run-time system. This poses no problem since the user is interested only in codes which are executed.

(2) If an instruction is eliminated during the optimization phase of the compilation, no profile information will be reported for that instruction since it will never be executed. Again, this poses no problem since the user is only concerned with executed instructions.

Next, restrictions specific to each of constructs (structures) to be profiled, i.e., region, loop, conditional, and procedure are listed below.

(a8-1) Region

Profile data collected for a timed region are elapsed time and invocation count (the number of times the program enters that region).

There are no restrictions for the elapsed time.

There is, however, one restriction transformation which causes an inaccurate invocation count (the number of times a region is entered) when the region is non-contiguous. The location where the invocation count is incremented must be assigned to satisfy the following requirement. For all control paths through the code which enters a timed region, there must be a single location in each path where the invocation count is incremented once. The location where the invocation count is incremented is determined so as to satisfy this requirement.

Figures 2A, 2B, 3:
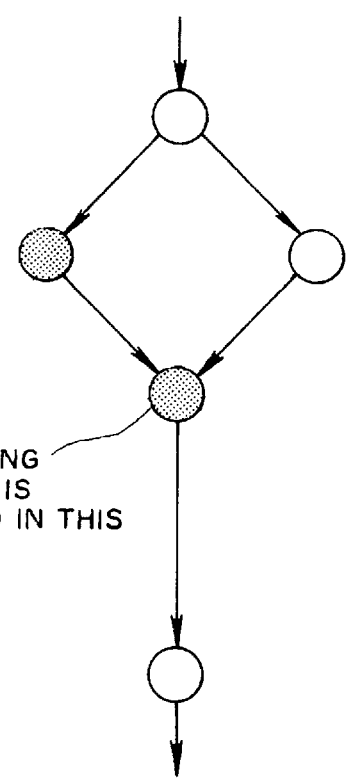
FIG. 2(a) and FIG. 2(b) are diagrams for explaining restrictions at the time of insertion of statements in the first embodiment.
FIG. 3 is a diagram for explaining restrictions at the time of insertion of statements in the first embodiment.

FIG. 2(a) shows a case where the above-described restriction is not satisfied, and FIG. 2(b) shows a case where the above-described restriction is satisfied. In FIGS. 2(a) and 2(b), circles represent code fragments, and lines with arrows between the respective circles represent control flow. Each of two screened circles (code fragments) contains a contiguous area of a single non-contiguous timed region. FIG. 2(a) shows an example in which a correct invocation count cannot be obtained (i.e., example in which increment location cannot be determined). FIG. 2(b) shows an example in which a correct counting up (incrementing) operation can be performed (i.e., example in which increment location can be determined).

This is not a severe restriction, since majority of the optimization transformations can be accommodated. If there is a case in which the above-described restriction is not satisfied, this is reported to the user during compilation.

(a8-2) Loop

Profiled data collected in a loop for which transformation satisfying the restriction has been performed are elapsed time, invocation count, and increment count (number of iteration of the loop). Loops for which transformation not satisfying the restriction has been performed are profiled as regions.

There are no restrictions on elapsed time.

For loops, a similar restriction is applied as a conversion restriction for obtaining a correct invocation count. Again, this is not a severe restriction since most cases will be able to assign the increment.

To obtain a correct loop iteration count, several restrictions on transformations must be considered. To explain this, a description will first given of the general shape of what is considered a proper (well-formed) loop in the transformed code, and then examples of restricted transformations are shown.

The following two points (3) and (4) are true for a well-formed loop after the calculation of the ExtendedRelatedStmtInfo and ExtendedRelatedCurStmt in the summarization phase.

(3) The ExtendedRelatedStmtInfo set contains only the original loop and instructions nested in the original loop.

(4) The ExtendedRelatedCurStmt set consists of an initialization section (the upper portion in FIG. 3) which precedes the loop, as shown in FIG. 3. The instructions in the initialization section is derived from only the original loop, and the current loop (loop formed by a transformed code) is derived from only the original loop. Thus, the current loop's body (the lower portion in FIG. 3) does not contain a code which has been moved from outside the original loop's body. FIG. 3 shows the state of ExtendedRelatedCurStmt after the ExtendedRelatedStmtInfo and the ExtendedRelatedCurStmt are calculated in the summarization phase.

An optimization which could transform an original loop into a well-formed loop (loop which satisfying the restrictions) but could cause the wrong number of increments (iteration count) is partial loop unrolling. The loop unrolling optimization is done to expand the size of the loop body's basic block in order to perform more optimization within the body. Since this transformation is common, the above-described restrictions (3) and (4) are slightly severe.

An example of partial loop unrolling will be shown below:

| do i = 1, 100 | --> | do i = 1, 100, 4 |
|                |  --> | A                 |
| A              |  --> | A                 |
|                |  --> | A                 |
|                |  --> | A                 |
| end do         |  --> | end do            |

(a8-3) Conditional

If the original conditional is transformed by a merge or expand as shown below, the conditional will not be profiled. This is a severe restriction since the merging and expanding of conditionals are common. If a non-profiled conditional exists, the instrumentation module can report that fact to the user at the time of compilation.

| if(A) then  | <--> | if((A) and (B)) then |
| if(B) then  | <--> |                      |
| ...         | <--> | ...                  |
| end if      | <--> |                      |
| end if      | <--> | end if               |

(a8-4) Procedure

If the compiler handles a procedure call by in-line processing, data will be incorrectly profiled as shown in the following items (5) and (6):

(5) The elapsed time, instead of being associated with a caller-callee pair, will be included in the caller (caller side). The invocation count will not be incremented for entering the inlined code.

(6) If procedures processed by in-line processing contain procedure calls, the caller-callee information for those procedures will be incorrect. The callers for those procedures will not be procedures which have been subjected to in-line processing but the callers of procedures which have been subjected to in-line processing.

(a9) Effects of First Embodiment

As described above, according to the first embodiment of the present invention, profiling instrumentation codes for a parallel processing system can be automatically inserted during compilation while easily performing mapping between an original source code and a transformed code obtained by the compilation. Accordingly, it is possible to easily obtain a profiling result having a form corresponding to the original source code based on the above-described mapping. Therefore, a user can effectively utilize the profiling result and reflect it in the preparation of programs.

(b) Second Embodiment (Profile Run-time System)

Figure 4:
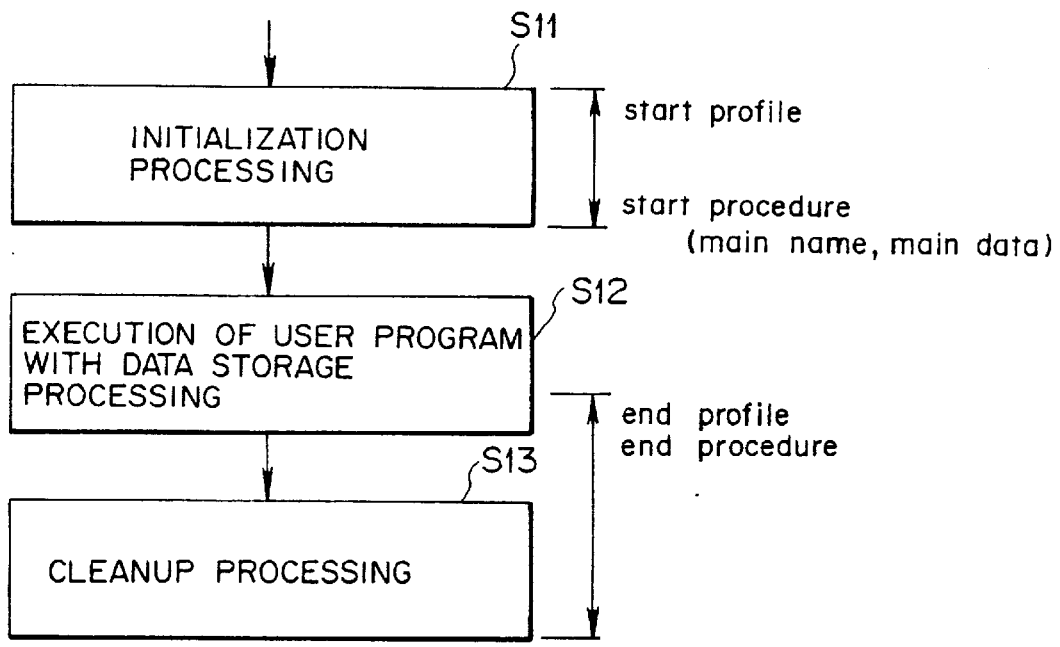
FIG. 4 is a flowchart for explaining a profile data collection method as a second embodiment of the present invention.

FIG. 4 is a flowchart (steps S11–S13) for explaining a profile data collection method as a second embodiment of the present invention. The present embodiment will be described while referring to the step numbers in this flowchart whenever necessary.

In the following description, the overview of a stack area, a heap area and a table, which are the main data structures of the present embodiment, will be described based on the drawings and functions.

The profile run-time system, to which the profile data collection method of the present embodiment is applied, handles a method for maintaining the profiling execution cost constant, and this method will be also described. Further, a method for making the cost involved in the lookup of a caller-callee table small and constant will be described in the subsection regarding the caller-callee table. Moreover, pseudo-code descriptions for utilizing the data structure of a profile library interface will be listed so as to show how the system of the present embodiment operates (see Table 2).

(b1) Data structures

In this section, a description will be given of data structures which are central to the timed user program phase (step S12 shown in FIG. 4; user program execution, profiling). The profile book keeping is handled by three internal structures: (1) a stack area which mimics the stack frame of timed regions, (2) a heap area of profile data records, and (3) a table of caller-callee record pairs. The data specific to constructs to be profiled as well as the underlying dynamic array data structures are described.

(b1-1) Internal stack

The stack area is a locally-managed data structure used primarily to determine the caller procedure. Upon entering a procedure, a caller procedure ID (LID) is obtained from the TOS (Top Of Stack), and appropriate caller-callee information is pushed into the stack area. At exit, the caller-callee information is popped from the stack area. As an implementation decision consistent with the profile interface, information for loop and region records are also pushed into the stack area to gather nesting information and to eliminate the need to pass the record as an argument to the end marker routines.

(b1-2) Internal heap

The internal heap area is used for allocating profile data records during the user program phase (step S12 shown in FIG. 4) in order to control the allocation cost. A huge internal heap area is allocated during initialization (step S11 shown in FIG. 4), and allocation on the heap area is performed, during the execution of a user program, by simply incrementing the pointer which indicates the write-in position of the heap area. All procedure, loop, region, logical if, arithmetic if, and caller-callee records are allocated on this heap area.

(b1-3) Caller-callee table

Profile data for procedures are collected and stored by the caller-callee table. The caller-callee table is a two-dimensional array which grows dynamically along two axes. The table, indexed by the ID of a caller (caller-side function) and the ID of a callee (callee-side function), stores the status of the caller-callee pairs. In the table entry, "NULL" is held if no record has been allocated for the caller-callee pair designated by the two IDs. Otherwise (if there is an allocated record), a pointer (PTR) designating the position of a caller-callee record is held.

Figure 5:
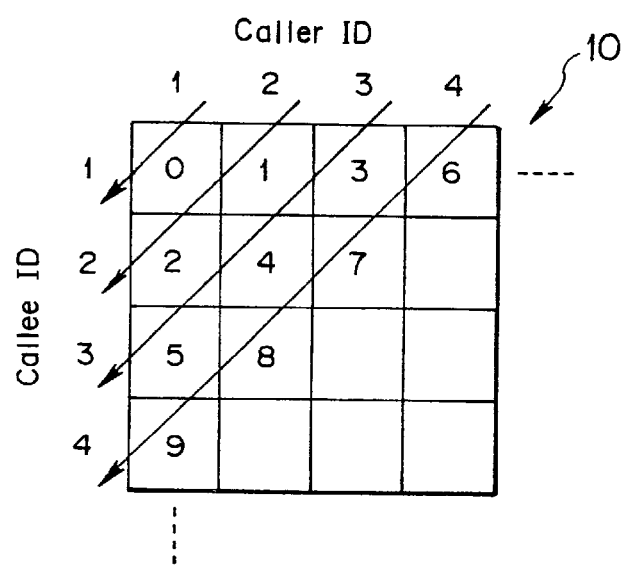
FIG. 5 is a diagram for explaining mapping of indexes of a caller-callee table from two dimension to single dimension in the second embodiment.

As shown in FIG. 5, the two-dimensional caller-callee table 10 is expressed as a one-dimensional table, using the following equation (1) so as to map the two-dimensional indexes caller, callee to a one-dimensional index f(caller, callee). The caller and callee are ID values for designating a caller side function and a callee side function. The f(caller, callee) is a one-dimensional index value calculated by the following equation (1), and the index value selectively takes the values described in the table 10 shown in FIG. 5.

$$f(\text{caller}, \text{callee}) = [(\text{caller} + \text{callee} - 1) * (\text{caller} + \text{callee} - 2)] / 2 + \text{callee} - 1 \quad (1)$$

(b1-4) Data record

A data structure is defined for each of constructs, i.e., loops, arithmetic if, logical if, timed regions, procedures, and caller-callee pairs, which are to be profiled. Each contains a counter(s) and/or a timer(s), and a unique local ID is assigned thereto.

(b1-5) Dynamic array

The dynamic array is a low-level data structure which supports dynamic expansion of one-dimensional array structures, and is used as the underlying implementation for the internal stack, the internal heap, and the table. The basic structure mimics a virtual-to-physical address transformation system.

Figure 6:
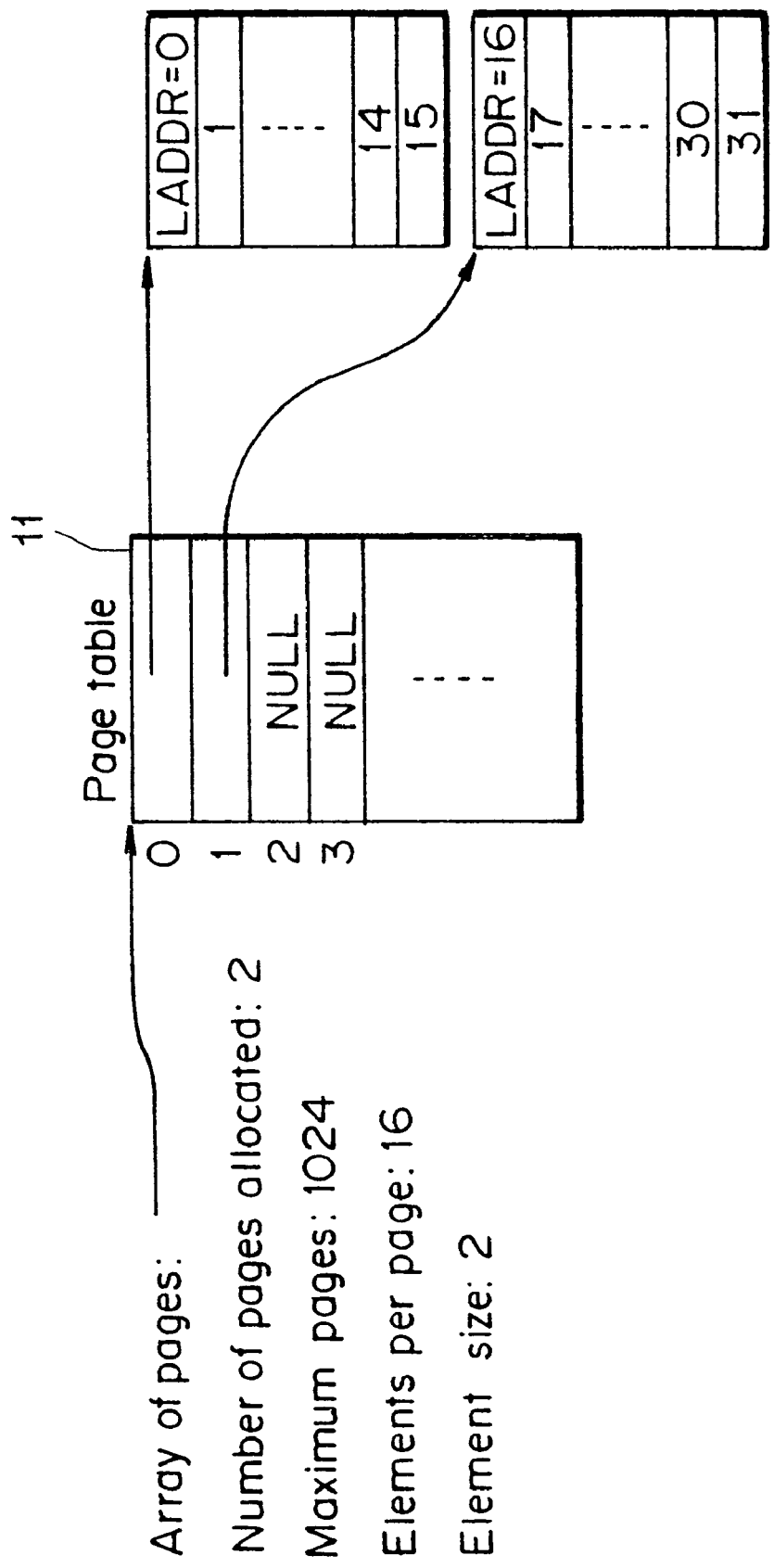
FIG. 6 is a diagram for explaining a dynamic array data structure in the second embodiment.

FIG. 6 is used for explaining the dynamic array data structure in the second embodiment. In FIG. 6, there are shown five basic components of the data type: (1) an array of pointers for designating many fixed-size pages each having fixed-size elements (Array of pages, Page table), (2) a number of elements per page, (3) an element size, (4) the maximum number of pages, and (5) a number of pages allocated.

The element size and the page size are given during initialization processing (step S11 shown in FIG. 4) such that each becomes a power of two, because of performance during operation. A single page is allocated when an instance is created, and subsequent pages are created upon explicit calls to extend the number of pages.

To determine the physical address of a virtual address, the page number "PageNumber" and the offset "Offset" (position with respect to the beginning of the page) are calculated using the following equations (2) and (3). The offset into the page points the first word in an element having a predetermined size. All virtual addresses must be transformed to physical addresses using the equations (2) and (3) rather than directly manipulating the physical addresses. Although this extra address calculation increases the lookup overhead, the cost is still constant.

$$\text{PageNumber}(LID) = LID \gg \log_2(\text{NumberElementsPerPage}) \quad (2)$$

$$\text{Offset}(LID) = (LID \,\&\, \wedge (\text{NumberElementsPerPage} - 1)) \ll \log_2(\text{ElementSize}) \quad (3)$$

In the above equations, LID represents a logical ID, $\gg$ and $\ll$ mean shifts, & means a logical product (AND), and $\wedge$ means negative (NOT).

In the example shown in FIG. 6, the number of elements per page (page size) is set to 16 ($=2^4$), the element size is set to 2 ($=2^1$), and the maximum number of pages is set to 1024 ($=2^{10}$). FIG. 6 shows a state in which two pages each including 16 elements are allocated (the number of pages allocated: 2).

Also, in the present embodiment, a pointer for designating each allocated page is stored in a page table 11, as shown in FIG. 6. The page table 11 can store page pointers the number of which corresponds to the number (1024 in the present embodiment) set as the maximum number of pages. "LADDR" in each element of each page means a logical address (virtual address).

(b2) Data structure usage

The data structure usage with respect to the profile library calls (instrumentation codes described in the first embodiment) inserted by the compiler will be described with reference to the following Table 2.

TABLE 2

| Profile Run-time library subroutine | Description |
|---|---|
| start profile(name,record) | Perform initialization for the profile run, and start timer for the timed phase. Initialize profile state. Push ROOT entry. Call start procedure(name,record). |
| end profile | Complete the user code profiling, summarize the collected data, output the data to a file, and deallocate memory. Call end procedure. Pop ROOT record. Gather and summarize profile data. Output profile data to file. Deallocate memory. |
| start procedure(name, record) | Start the timer and increment counter for caller-callee pair. If procedure record not allocated, allocate procedure record with name. Get caller LID from the TOS. Lookup caller-callee record in table. If entry is NULL, allocate caller-callee record. Start timers and increment counters. Push to stack. |
| end procedure | Stop the timer in the caller-callee record. Pop stack. Stop timer in popped record. |
| start loop(name,record, entry incr) start region(name,record, entry incr) | Start timer and increment counters for the loop or region. If loop/region record not allocated, allocate record with name. Start timer and increment counters. Push to stack |
| end loop end region | Stop the timer in loop or region record. Pop stack. Stop timer in popped record. |
| incr loop | Increment the number of loop iterations for the loop. Get record at TOS. |

TABLE 2-continued

| Profile Run-time library subroutine | Description |
|---|---|
| | Increment counter for record at TOS. |
| start log if(name,record, value) | Increment the conditional count for record based on value. |
| start arith if(name,record, value) | If conditional record not allocated, allocate record with name. Increment value count based on value. |

(b3) Overview of Second Embodiment In the present embodiment, as shown in FIG. 4, the profiled run is organized in three major phases {initialization (step S11), user program execution (step S12), and cleanup (step S13). The user code processing including time-sensitive profiling (user program execution including processing for data storage) is discriminated from the time-consuming intiallization of the profile run-time system, and the cleanup.

The profile execution starts with "start profile" (instrumentation code). First, the internal profile data structures (heap area, stack area, table, and timer) are initialized (step S11). After completion of initialization, "start profile" calls "start procedure" which operates the timer for the user code to be timed.

In the user code execution phase (step S12), the original user code is executed by calls to the profile run-time library subroutines. During this phase, the cost of the profile overhead is maintained constant and minimal. In this phase, push and pop to the stack, allocating records on the internal heap area, looking up information in the caller-callee table, recording start and end time information, and incrementing counters are performed as a user program is executed, thereby carrying out storage processing for profile data. No interprocessor communication is done during this phase. This phase ends when "end procedure" is called by "end profile".

The cleanup phase (step S13) has the following three purposes: (1) summarization of the profile data, (2) writing the data into a file, and (3) deallocation of the dynamically-allocated memory. Because the data stored during execution is minimal and kept local to the node in order to minimize the heap space for each record, additional processing of the profile collected data is required. A global ID is assigned to the local profile data distributed across processors, and the average, minimum, maximum, and standard deviation data for each record are calculated. The data are outputted in a format which can be read by a profile data viewer application.

Figure 11:
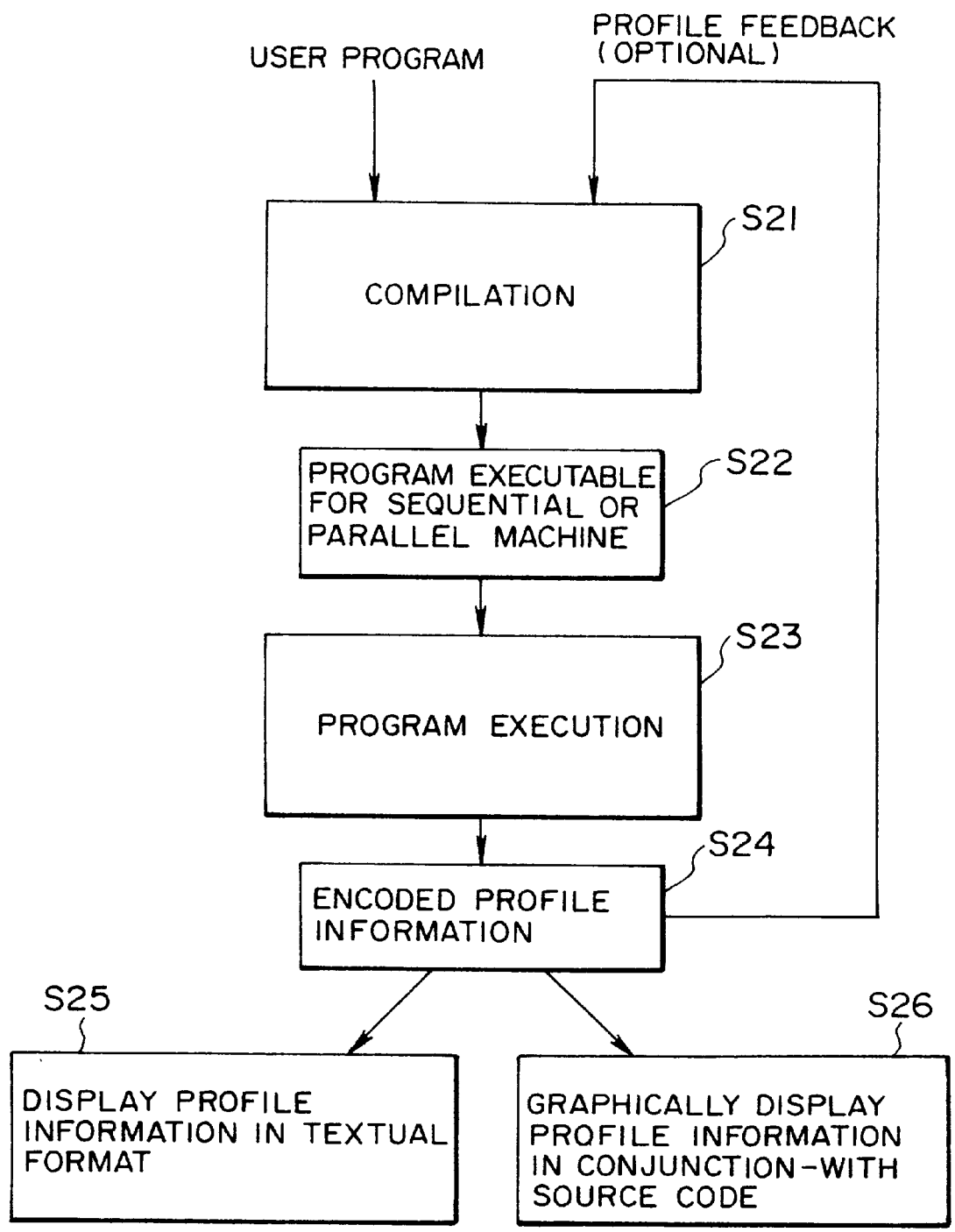
FIG. 11 is a flowchart for explaining the overall operation of the second embodiment.
Figure 12:
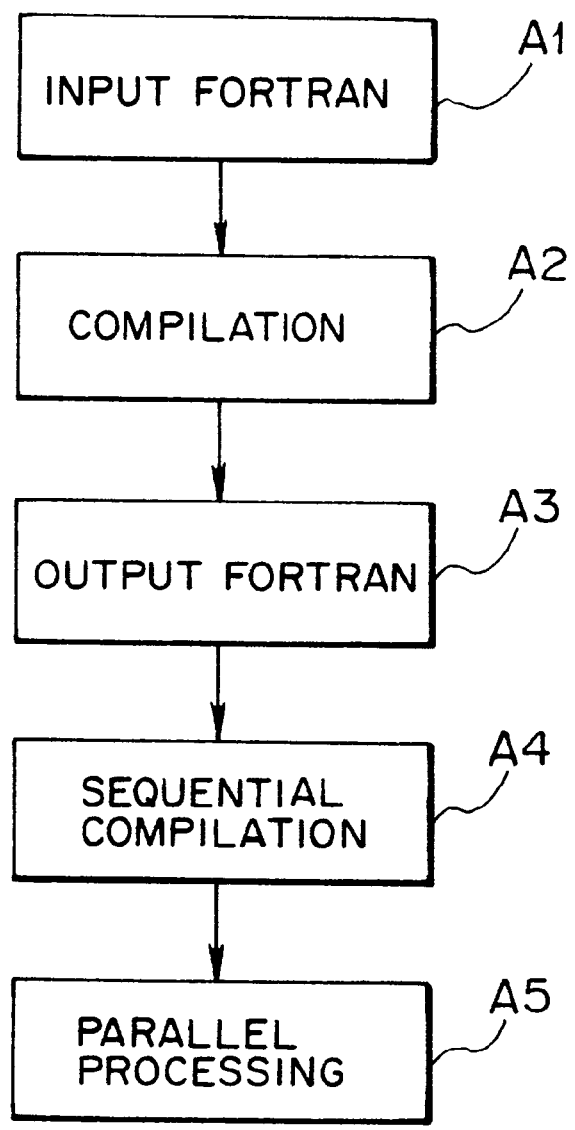
FIG. 12 is a flowchart for explaining the steps of a general compilation in the case where parallel processing is performed.

In detail, as shown in FIG. 11, the user program is transformed by compilation into a program executable by a single or parallel machines (steps S21 and S22), and the translated program is executed (step S23). In step S21, the profile instrumentation is performed in the manner as has been described in the first embodiment, and in step S23, the processing for procedures shown in FIG. 4 is performed.

The encoded profile information which is obtained through program execution in step S23 is optionally fed back to the compilation (step S21). Also, it is displayed in a text format (step S25) or is graphically displayed together with the source code (step S26).

(b4) Concrete Example

The fragment code shown below will be used to illustrate, as an example 1, the operations of the run-time library during the profile execution. The code fragment is a subroutine consisting of several code regions A, B, and C. Instrumentation codes have been inserted by the compiler so as to record the beginning and end of the procedure, and the beginning and end of a timed region B, and so as to record source code information about the procedure and the region.

Also, as a second example, there is illustrated the virtual-to-physical address transformation used in the dynamic array data structure.

```
01 SUBROUTINE foo
02    CHARACTER*4 name1
03    CHARACTER*25 name2
04    INTEGER*4 record1,record2
05    SAVE name1,record1,name2,record2
06    DATA record1/0/,record2/0/
07    DATA name1/'foo'/,name2/'{34 34 forall(i=1:100:2)}'/
08    call start procedure(name1,record1)
09    ...A...
10    call start region(name2,record2)
11    ...B...
12    call end region
13    ...C...
14    call end procedure
15 end
```

(b4-1) Example 1
Step A—Before entering subroutine foo

For the purpose of this example, it is assumed that a procedure with local ID 3 calls the subroutine foo, and the subroutine foo is called for the first time. The states of the internal stack area, the heap area, and the caller-callee table 10 are sown in FIGS. 7(a), 7(b) and 7(c), respectively.

Immediately after the subroutine foo is inputted, the caller's information is located at the top of the internal stack area (TOS=Top Of Stack), the heap area is in a certain state, and the caller-callee table has not contained yet the information for the subroutine foo because it has not been entered yet.

FIGS. 7(a), 7(b) and 7(c) respectively show the internal states of the stack area, the heap area, and the caller-callee table 10 after the subroutine foo has been inputted. The screened area within the caller-callee table 10 shown in FIG. 7(c) specifies a valid possible caller-callee pair.

Step B—Call start procedure

The record1 variable of the NULL value passed as an argument indicating the subroutine foo is called for the first time. When a procedure is entered for the first time, the registration sequence is performed once. For subsequent calls to the subroutine foo, the caller-callee table is checked to see whether a record for the pair has already been allocated. If not, one is allocated off the heap area.

In this case, a local ID 4 is generated for the subroutine foo, as shown in FIGS. 8(a), 8(b) and 8(c), procedure record (Proc record; proc=4) is allocated on the heap area, and a caller-callee record (CC record; caller=3, callee=4) for the pair is allocated on the heap area. The entry at a location (caller=3, callee=4) on the caller-callee table 10 is changed from NULL to a pointer (PTR), and the caller information (CC info; caller=3, callee=4) is pushed into the stack area, and the timer is initialized.

FIGS. 8(a), 8(b) and 8(c) respectively show the internal states of the stack area, the heap area, and the caller-callee table 10 after the instrumentation code "start procedure" has been called. The screened area within the caller-callee table 10 shown in FIG. 8(c) specifies a valid possible caller-callee pair.

Step C—Call start region

Because this is the first time to enter the region, a region record is allocated off the heap area, and a local ID is assigned thereto. In this case the local ID is −1. The region information (Region info; region=−1) is pushed to the stack area, and the region timers are initialized, as shown in FIG. 9(a).

Figure 9A:
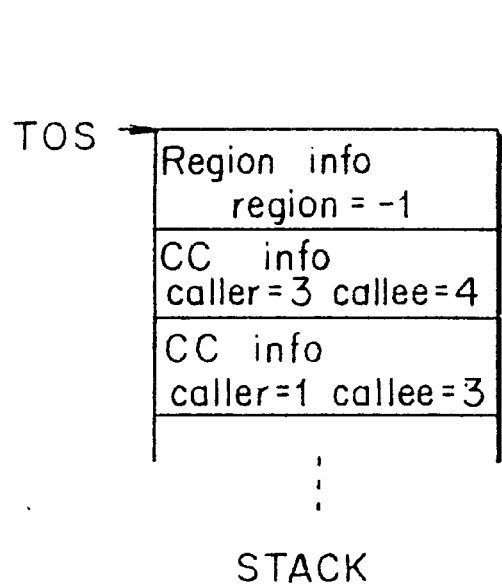
FIG. 9(a) and FIG. 9(b) are diagrams for explaining the concrete example of data storage processing in the second embodiment.
Figure 9B:
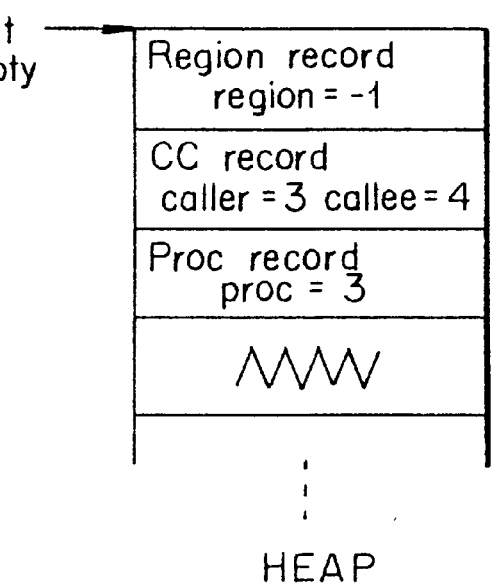

FIGS. 9(a) and 9(b) respectively show the internal states of the stack area and the heap area after the instrumentation code "start region" has been called.

Step D—Call end region and end procedure

Figure 10A:
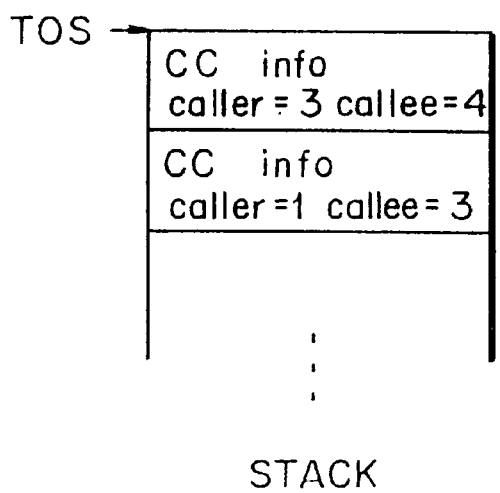
FIG. 10(a) and FIG. 10(b) are diagrams for explaining the concrete example of data storage processing in the second embodiment.

After exiting the region B, the call to "end region" pops the region information (Region info; region=−1) of the stack area, so that the stack area becomes the state shown in FIG. 10(a). Also, the timer for the popped record is stopped.

Figure 10B:
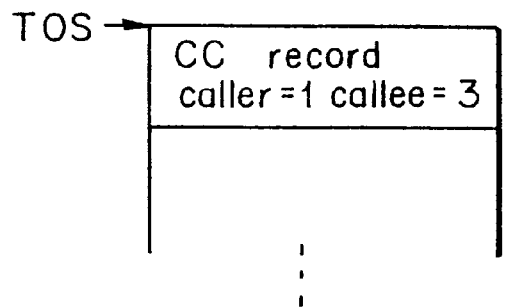

After exiting the region C, the call to "end procedure" pops the caller information (CC info; caller=3, callee=4) of the stack area, so that the stack area becomes the state shown in FIG. 10(b). Also, the timer for the popped caller-callee record is stopped.

FIGS. 10(a) and 10(b) respectively show the internal state of the stack area after the "end region" has been called and the stack area after the "end procedure" has been called.

(b4-2) Example 2

In this second example, descriptions will be given of the function of mapping the two-dimensional caller-callee data to one-dimensional data, and the calculation for conversion from logical addresses (virtual addresses) in the underlying dynamic array to physical addresses. To calculate the index into the caller-callee table for a particular caller-callee pair, the caller and callee local IDs are inserted into the equation (1). In the case of caller=3 and callee=4 as shown in Example 1, the one dimensional index becomes 18 (f(3,4)= 18).

To access the virtual address 18 in the caller-callee table's underlying dynamic array structure, the page number and the offset are first calculated based on the number of elements per page (entry number) and the element size (entry size). For the purpose of this example, it is assumed that a page contains 16 entries, each entry has a two-word length, and two pages have already been allocated, as in the example shown in FIG. 6. If the page size is 16 entries, the shift count for computing the page number is log2(16) and the offset mask is ∧(16−1). The entry 18 is located on page 2 at offset 2, as calculated by the equations (2) and (3) and shown in FIG. 6.

(b5) Effects of Second Embodiment.

As described above, in the second embodiment of the present invention, since the overhead cost of operations frequently performed during the execution of profiling can be made small and constant, it is possible to regard, from a practical viewpoint, the execution of a program accompanied by profiling to be substantially the same as the execution of a corresponding program not accompanied by profiling. In addition, due to the constant cost, it is possible to easily calculate overhead due to profiling, thereby making it possible to easily obtain the execution time for the case in which the profiling is not performed.

Further, by pushing the initialization cost and the cleanup cost outside the program execution processing (step S12 shown in FIG. 4) for performing data storage processing involved in profiling, the cost of the frequently performed operations (push/pop to the stack area, allocation to the heap area, and lookup of the table 10) can be made small and substantially constant.

Moreover, since the table 10 for holding the caller-callee relationship is provided in the dynamic array data structure and is expressed as a two-dimensional table mapped to a one-dimensional table, it is possible to prevent the memory area from being wastefully used, while maintaining constant the lookup cost without increasing overhead.

(c) Others

In the above-described embodiments, descriptions were given of the cases where the original source code is an HPF code, and the target language code obtained through transformation is Fortran 90 code. However, the present invention is not limited thereto, and is applicable to cases where other languages are used. Even in such cases, actions and effects similar to those of the above-described embodiments can be obtained.

What is claimed is:

1. A profile instrumentation method for providing profiling in a parallel computer to grasp the behavior of a shared program, which is written in a sequential format using an original source code, while a plurality of processors are in operation at one time based on instructions of the shared program, performing profile initialization processing to collect information regarding the original source code of said program;

after performing the profile initialization processing, transforming said original source code of said program into a plurality of groups of transformed code, each group corresponding to one of the plurality of processors; and inserting instrumentation code into said plurality of groups of transformed code for instructing collection of profile data during execution of said program by said plurality of processors.

2. The profile instrumentation method according to claim 1, wherein said information regarding the original source code comprises, for each statement written in said original source code, file information, location information, a character-string statement, a statement kind, and information regarding a parent statement.

3. The profile instrumentation method according to claim 2, wherein during said transforming step, history maintaining processing is performed so as to store, for each statement, information specifying the original statement of each statement, as transformation history information.

4. The profile instrumentation method according to claim 3, further comprising:

performing summarization processing in which statements derived from the same original statement are identified so as to extract necessary information from said transformation history information, thereby summarizing said transformation history information, mapping said plurality of groups of transformed code to the original source code, and performing instrumentation processing to insert said instrumentation code into said plurality of groups of transformed code based on the information extracted by said summarization processing and in accordance with a predetermined restriction.

5. The profile instrumentation method according to claim 1, wherein during said transforming step, history maintaining processing is performed so as to store, for each statement, information specifying the original statement of each statement, as transformation history information.

6. The profile instrumentation method according to claim 5, further comprising:

performing summarization processing in which statements derived from the same original statement are identified so as to extract necessary information from said transformation history information, thereby summarizing said transformation history information, mapping said plurality of groups of transformed code to the original source code, and performing instrumentation processing to insert said instrumentation code into said plurality of groups of transformed code based on the information extracted by said summarization processing and in accordance with a predetermined restriction.

7. A profile data collection method in which profile data are obtained and collected during the execution of a program so as to grasp the behavior of the program, comprising:

setting a stack area adapted to be used in determining caller procedure, a heap area adapted to be used in allocating profile data records, and a table in a dynamic array data structure;

profiling the program including inserting instrumentation code into the program for instructing collection of profile data during execution of the program; and collecting the profile data in response to the instrumentation code while data storage processing is performed so as to store the profile data into said stack area, said heap area, and said table.

8. The profile data collection method according to claim 7, wherein said stack area stores data to be used in determining the caller procedure, said heap area stores profile data records measured during the execution of said program, and said table stores the status of caller-callee pairs.

9. The profile data collection method according to claim 8, wherein at the beginning of measurement of profile data, information regarding an object to be profiled is pushed into said stack area, and at the end of said measurement, said information is popped from said stack area;

a profile data record obtained via measurement is written into said heap area; and the caller-callee relationship of functions subjected to profiling is written into said table so as to hold these data.

10. The profile data collection method according to claim 9, wherein said table for holding the relationship between a caller and a callee is expressed as a two-dimensional array mapped into a single dimensional array.

11. The profile data collection method according to claim 10, wherein initialization processing for securing areas for said stack area, said heap area and said table, and cleanup processing for cleaning up said stack area, said heap area and said table after completion of said profiling are both executed independently of program execution processing including said profiling.

12. The profile data collection method according to claim 8, wherein initialization processing for securing areas for said stack area, said heap area and said table and cleanup processing for cleaning up said stack area, said heap area and said table after completion of said profiling are both executed independently of program execution processing including said profiling.

13. The profile data collection method according to claim 9, wherein initialization processing for securing areas for said stack area, said heap area and said table, and cleanup processing for cleaning up said heap area and said table after completion of said profiling are both executed independently of program execution processing including said profiling.

14. The profile data collection method according to claim 7, wherein said stack area stores at least one of the following types of data: a caller procedure ID and caller-callee information, said heap area stores at least one of the following types of data: procedure, loop, region, logical if, arithmetic if and caller-callee records, and said table stores the status of caller-callee pairs.

15. The profile data collection method according to claim 14, wherein at the beginning of measurement of profile data, information regarding an object to be profiled is pushed into said stack area, and at the end of said measurement, said information is popped from said stack area;

a profile data record obtained via measurement is written into said heap area; and the caller-callee relationship of functions subjected to profiling is written into said table so as to hold these data.

16. The profile data collection method according to claim 15, wherein said table for holding the relationship between a caller and a callee is expressed as a two-dimensional array mapped into a single dimensional array.

17. The profile data collection method according to claim 16, wherein initialization processing for securing areas for said stack area, said heap area and said table, and cleanup processing for cleaning up said stack area, said heap area and said table after completion of said profiling are both executed independently of program execution processing including said profiling.

18. The profile data collection method according to claim 15, wherein initialization processing for securing areas for said stack area, said heap area and said table, and cleanup processing for cleaning up said heap area and said table after completion of said profiling are both executed independently of program execution processing including said profiling.

19. The profile data collection method according to claim 14, wherein initialization processing for securing areas for said stack area, said heap area and said table and cleanup processing for cleaning up said stack area, said heap area and said table after completion of said profiling are both executed independently of program execution processing including said profiling.

20. A profile data collection method in which profile data are obtained and collected during the execution of a program so as to grasp the behavior of the program, wherein a stack area, a heap area, and a table are previously set on a dynamic array data structure;

when profiling is performed so as to collect profile data, data storage processing is performed so as to store data regarding said profiling into said stack area, said heap area, and said table;

at the beginning of measurement of profile data, information regarding an object to be profiled is pushed into said stack area, and at the end of said measurement, said information is popped from said stack area;

a profile data record obtained via measurement is written into said heap area; and the caller-callee relationship of functions subjected to profiling is written into said table so as to hold these data.

21. The profile data collection method according to claim 20, wherein said table for holding the relationship between a caller and a callee is expressed as a two-dimensional array mapped into a single dimensional array.

22. The profile data collection method according to claim 21, wherein initialization processing for securing areas for said stack area, said heap area and said table, and cleanup processing for cleaning up said stack area, said heap area and said table after completion of said profiling are both executed independently of program execution processing including said profiling.

23. The profile data collection method according to claim 20, wherein initialization processing for securing areas for said stack area, said heap area and said table, and cleanup processing for cleaning up said stack area, said heap area and said table after completion of said profiling are both executed independently of program execution processing including said profiling.

24. A profile data collection method in which profile data are obtained and collected during the execution of a program so as to grasp the behavior of the program, wherein a stack area, a heap area, and a table are previously set on a dynamic array data structure;

when profiling is performed so as to collect profile data, data storage processing is performed so as to store data regarding said profiling into said stack area, said heap area, and said table; and initialization processing for securing areas for said stack area, said heap area and said table, and cleanup processing for cleaning up said stack area, said heap area and said table after completion of said profiling are both executed independently of program execution processing including said profiling.

* * * * *